United States Patent [19]

Ohe

[11] Patent Number: 4,865,146

[45] Date of Patent: Sep. 12, 1989

[54] FOUR-WHEEL STEERING SYSTEM

[75] Inventor: Takeshi Ohe, Saitama, Japan

[73] Assignee: Jidosha Kiki Co., Ltd., Tokyo, Japan

[21] Appl. No.: 261,035

[22] Filed: Oct. 21, 1988

[30] Foreign Application Priority Data

Oct. 23, 1987 [JP] Japan .................................. 62-266577

[51] Int. Cl.$^4$ .............................................. B62D 5/04
[52] U.S. Cl. .................................... 180/79.1; 180/140; 180/142; 280/91; 364/424.01
[58] Field of Search ............... 180/140, 142, 148, 79.1; 280/91; 364/424.01

[56] References Cited

U.S. PATENT DOCUMENTS

| | | | |
|---|---|---|---|
| 4,653,601 | 3/1987 | Nakamura et al. ................. | 180/79.1 |
| 4,716,981 | 1/1988 | Murao .................................. | 180/79.1 |
| 4,716,982 | 1/1988 | Ishii et al. ............................ | 180/140 |
| 4,782,907 | 11/1988 | Morishita et al. .................... | 180/142 |
| 4,785,901 | 11/1988 | Maeda .................................. | 180/142 |
| 4,828,061 | 5/1989 | Kimbrough et al. ............... | 180/79.1 |

FOREIGN PATENT DOCUMENTS 61-146675  7/1986  Japan .................................. 180/140
62-94473   4/1987  Japan .................................. 180/140

Primary Examiner—Charles A. Marmor
Assistant Examiner—Donn McGiehan
Attorney, Agent, or Firm—Blakely, Sokoloff, Taylor & Zafman

[57] ABSTRACT

A four-wheel steering system includes a torque sensor, a first steering angle sensor, a vehicle speed sensor, a second steering angle sensor, a first DC motor, a second DC motor, and a controller. The torque sensor outputs a front-wheel steering force signal. The first steering angle sensor outputs a front-wheel steering angle signal. The vehicle speed sensor outputs a vehicle speed signal. The second steering angle sensor outputs a rear-wheel steering angle signal. The first DC motor supplies a torque to a front-wheel steering system. The second DC motor supplies a torque to a rear-wheel steering system. The controller outputs a rear-wheel steering force signal by detecting a current supplied to the second DC motor, and determines a control target value by receiving the front- and rear-wheel steering force signals and the front- and rear-wheel angle signals, and the vehicle speed signal.

3 Claims, 3 Drawing Sheets

FOUR-WHEEL STEERING SYSTEM

BACKGROUND OF THE INVENTION

The present invention relates to a four-wheel steering system and, more particularly to a four-wheel steering system for controlling a vehicle by detecting the traveling state of the vehicle.

As disclosed in, e.g., Japanese Patent Laid-Open (Kokai) No. 62-94473, in a conventional four-wheel steering system, control of rear wheels is determined by signals from a sensor for a steering angle and the like, and a vehicle speed sensor, all of which are attached to front wheels.

As described above, the rear wheels are controlled by the signals from the sensors attached to the front wheels. Therefore, the front wheels cannot be controlled again using a detection signal obtained by detecting the motion of the rear wheels. It is impossible to perform such control.

SUMMARY OF THE INVENTION

It is an object of the present invention to provide a four-wheel steering system which can improve controllability of a vehicle.

It is another object of the present invention to provide a four-wheel steering system which can improve system reliability.

It is still another object of the present invention to provide an inexpensive four-wheel steering system.

In order to achieve the above objects of the present invention, there is provided a four-wheel steering system comprising a torque sensor for detecting a front-wheel steering force and outputting a first steering force signal, a first steering angle sensor for detecting a front-wheel steering angle and outputting a first steering angle signal, a vehicle speed sensor for detecting a vehicle speed and outputting a vehicle speed signal, a second steering angle sensor for detecting a rear-wheel steering angle and outputting a second steering angle signal, a first DC motor for supplying a torque to a front-wheel steering system, a second DC motor for supplying a torque to a rear-wheel steering system, and a controller for detecting a current supplied to the second DC motor and generating a second steering force signal representing a rear-wheel steering force, and receiving the first steering force signal, the first and second steering angle signals, and the vehicle speed signal and determining a control target value.

According to the four-wheel steering system of the present invention, an actual traveling state of the vehicle is determined by using signals from the front- and rear-wheel sensors and the vehicle speed sensor, and an optimal target value corresponding to the traveling state can be set, improving controllability of a vehicle and system reliability, and resulting in low cost.

DESCRIPTION OF THE PREFERRED EMBODIMENT

Figure 1:
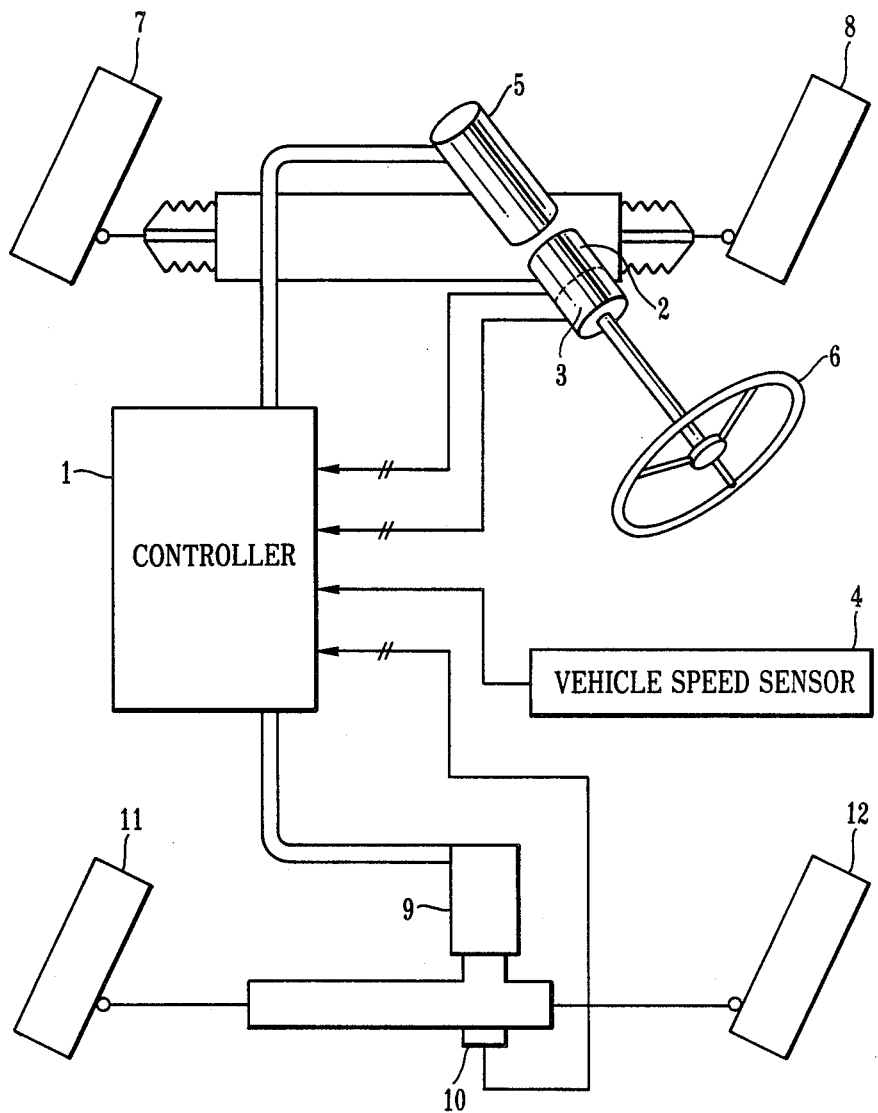
FIG. 1 is a view showing an overall arrangement of a four-wheel steering system according to an embodiment of the present invention.

FIG. 1 shows an overall arrangement of a four-wheel steering system according to an embodiment of the present invention. Referring to FIG. 1, reference numeral 1 denotes a controller for controlling an overall operation of a vehicle; 2, a torque sensor for outputting a steering force signal; 3, a steering angle sensor for outputting a steering angle signal; 4, a vehicle speed sensor for outputting a vehicle speed signal; 5, a DC motor for controlling the turning resistance of a steering wheel 6; 7 and 8, front wheels; 9, a DC motor for controlling the steering angle of rear wheels 11 and 12; and 10, a steering angle sensor for detecting a steering angle of the rear wheels and outputting a steering angle signal.

The system has three functions. The first function is to control the steering angle of the rear wheels by using steering angle, steering force, and vehicle speed signals of the front wheels. The second function is to control the steering angle of the rear wheels and the steering force of the front wheels by determining the traveling state (turning radius, yaw rate, and lateral acceleration) of the vehicle from the steering angle, steering force, and vehicle speed signals of the front and rear wheels. The third function is to correct lateral vibrations of the vehicle due to the influences of a side wind.

Figure 2:
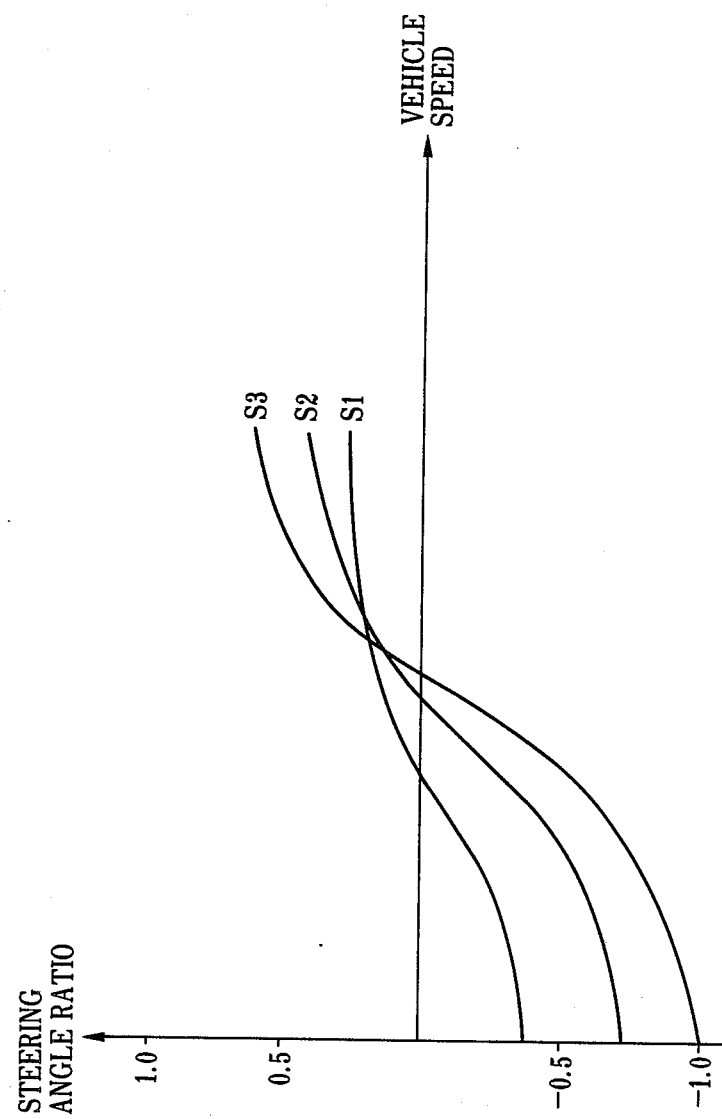
FIG. 2 is a graph for explaining a first function of the system.

The first function will be described below with reference to FIG. 2. In FIG. 2, the axis of abscissa represents a vehicle speed, whereas the axis of ordinate represents a steering angle ratio, i.e., the ratio of a rear-wheel steering angle to a front-wheel steering angle. Reference symbols S1, S2, and S3 respectively denote steering angle ratio control curves when a front-wheel steering force is small, intermediate, and large. When the front-wheel steering force is small, the steering angle ratio is set to be a small opposite-phase ratio if the vehicle speed is small, whereas it is set to be a small in-phase ratio if the vehicle speed is large, as indicated by the curve S1. A small steering force means that the vehicle is traveling on a road having a small friction coefficient. Therefore, spin or slip must be prevented by setting a small rear-wheel steering angle. In addition, the steering angle ratio is set to be an opposite-phase ratio when the vehicle speed is small so as to allow the vehicle to make a small sharp turn.

TABLE 1

| Detection Item | Sensor used | Detection Data | | | | |
| --- | --- | --- | --- | --- | --- | --- |
| | | A | B | C | D | E |
| front-wheel steering angle | steering angle sensor | large | large | intermediate | small | intermediate |
| front-wheel steering force | torque sensor | large | intermediate | intermediate | intermediate | small |
| rear-wheel steering angle | steering angle sensor | large | intermediate | intermediate | small | small |

TABLE 1-continued

| Detection Item | Sensor used | Detection Data | | | | |
|---|---|---|---|---|---|---|
| | | A | B | C | D | E |
| rear-wheel steering force | motor current | large | intermediate | intermediate | small | small |
| vehicle speed | vehicle speed sensor | 0 | low | intermediate | high | intermediate |

The second function will be described below with reference to Tables 1 to 3. Table 1 shows detection items, the sensors used, and detection data. With respect to detection data A, the front-wheel steering angle and force, and rear-wheel steering angle and force are large, and the vehicle speed is zero. The length of a turning radius representing a traveling state is determined by the sum of front- and rear-wheel steering angles. A yaw rate is determined by the sum of front- and rear-wheel steering angles, and a vehicle speed. A lateral acceleration is determined by a yaw rate taken into consideration together with slip. According to the above-described determination factors, the traveling state with respect to the data A is that the turning radius is small, and the yaw rate and the later acceleration are zero. This traveling state is termed a traveling state A in accordance with the detection data A. Similarly, in accordance with the detection data B to E, corresponding states are respectively termed traveling states B to E. Table 2 shows traveling states and general cases corresponding thereto.

TABLE 2

| | Traveling State | General Case |
|---|---|---|
| State A | small turning radius, and zero yaw rate and lateral acceleration | stationary swing |
| State B | small turning radius, and intermediate yaw rate and lateral acceleration | traveling in streets and at perpendicular curves |
| State C | intermediate turning radius, and large yaw rate and lateral acceleration | traveling on winding mountain roads |
| State D | large turning radius, and small yaw rate and lateral acceleration | high-speed traveling |
| State E | intermediate turning radius, intermediate yaw rate, and small lateral acceleration | traveling in rain or snow |

Control target values shown in Table 3 are set from these traveling states. Table 3 shows front-wheel steering angles and steering angle ratios as control targets. For example, with respect to the traveling state A, a control operation is performed such that the front-wheel steering force and the steering angle ratio are set to be small and a large opposite-phase ratio. With this operation, the turning resistance of the steering wheel is decreased, and hence the vehicle can make a small sharp turn. This operation can be easily understood from the fact that the general case corresponding to the traveling state A is stationary swing.

TABLE 4

| Control Object | Control Target Value | | | | |
|---|---|---|---|---|---|
| | A | B | C | D | E |
| front-wheel steering force | small | small | intermediate | large | large |
| steering angle ratio | large opposite-phase ratio | intermediate opposite phase ratio | intermediate in-phase ratio | small in-phase ratio | small in-phase ratio |

| | Front-Wheel Steering Force | Front-Wheel Steering angle |
|---|---|---|
| with side wind | 2 | 1 |
| without side wind | 1 | 2 |

Figure 3:
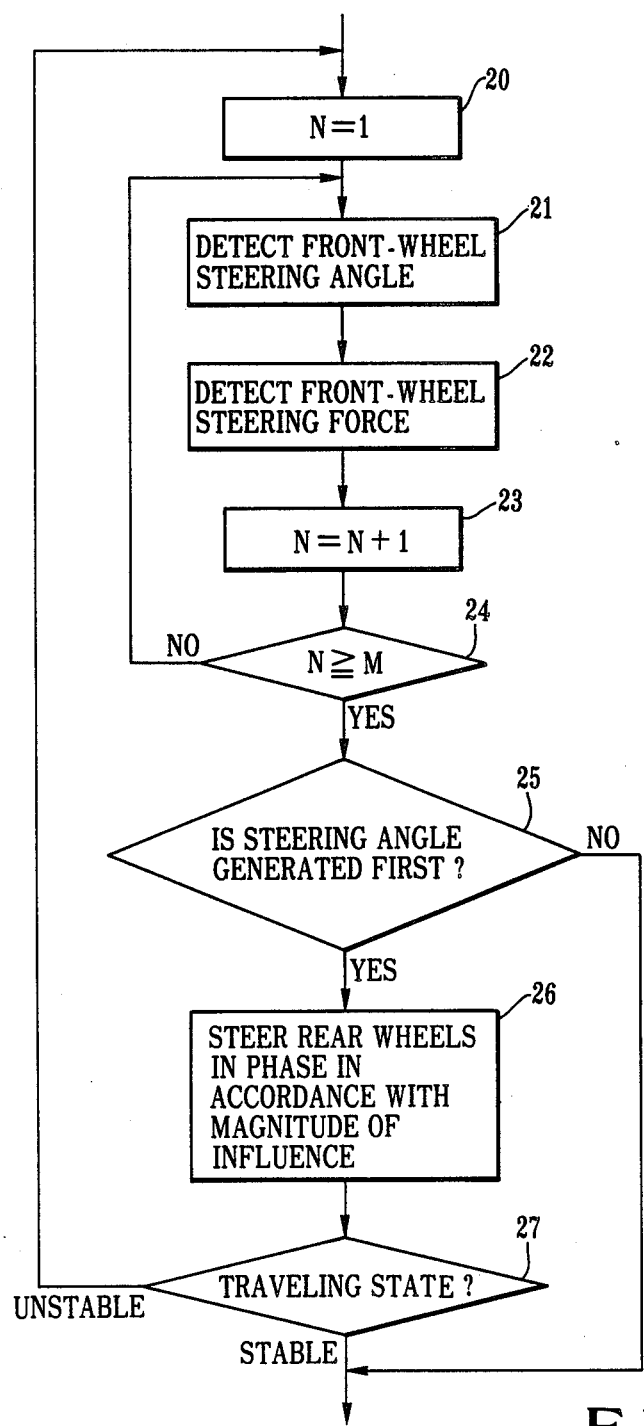
FIG. 3 is a flow chart for explaining a third function of the system.

The third function will be described below with reference to FIG. 3 and Table 4. FIG. 3 is a flow chart for explaining an operation of the system. Table 4 shows the order of generation of front-wheel steering forces and angles with and without a side wind. When a side wind is present, a steering angle is generated first, and then a steering force is generated. Referring to FIG. 3, in step S20, initialization is performed, i.e., N=1 is set. In steps 21 and 22, front-wheel steering angle and force are detected by a predetermined number of times (M times). Then, the flow advances to step 25 (through steps 23 and 24). In step 25, it is determined whether the steering angle is generated earlier than the steering force. If YES in step 25, the flow advances to step 26. If NO in step 25, processing in this routine is completed because a normal steering operation is performed. In step 26, the rear wheels are steered in phase in accordance with the magnitude of the influences of the side wind. A phase amount may be determined by, e.g., a chart. Subsequently, the traveling state upon rear-wheel steering is determined. If it is determined to be unstable, the flow returns to step 20 to star the control operation again. If it is stable, this routine is finished (step 27).

As has been described above, according to the present invention, since a control target value is determined by supplying the first and second steering force and angle signals, and the vehicle speed signal to a controller, the vehicle can be controlled upon accurate detection of the traveling state of the vehicle. Therefore, vehicle controllability such as response characteristics, control precision, and control flexibility can be improved.

In addition, a controller is not required for each DC motor for driving the steering system. That is, only one controller is required. Therefore, a low-cost system can be realized.

Moreover, since the system of the present invention can be realized by a total electrical system, system reliability can be improved.

What is claimed is:

1. A four-wheel steering system comprising:
    a torque sensor for detecting a front-wheel steering force and outputting a first steering force signal;

a first steering angle sensor for detecting a front-wheel steering angle and outputting a first steering angle signal;
a vehicle speed sensor for detecting a vehicle speed and outputting a vehicle speed signal;
a second steering angle sensor for detecting a rear-wheel steering angle and outputting a second steering angle signal;
a first DC motor for supplying a torque to a front-wheel steering system;
a second DC motor for supplying a torque to a rear-wheel steering system; and
a controller for detecting a current supplied to said second DC motor and generating a second steering force signal representing a rear-wheel steering force, and receiving the first steering force signal, the first and second steering angle signals, and the vehicle speed signal and determining a control target value.

2. A system according to claim 1, wherein the control target value is a steering angle ratio determined by front-wheel steering angle and force signals, and a vehicle speed signal.

3. A system according to claim 1, wherein the control target value is defined by the front-wheel steering force and a steering angle ratio, both of which are determined by the first steering angle and force signals, the second steering angle and force signals, and the vehicle speed signal.

* * * * *